Nov. 3, 1936.  W. F. STEENWEG  2,059,671
CABINET FOR ELECTRICAL CONTROL DEVICES AND METHOD OF MAKING THE SAME
Filed April 15, 1935   3 Sheets-Sheet 1
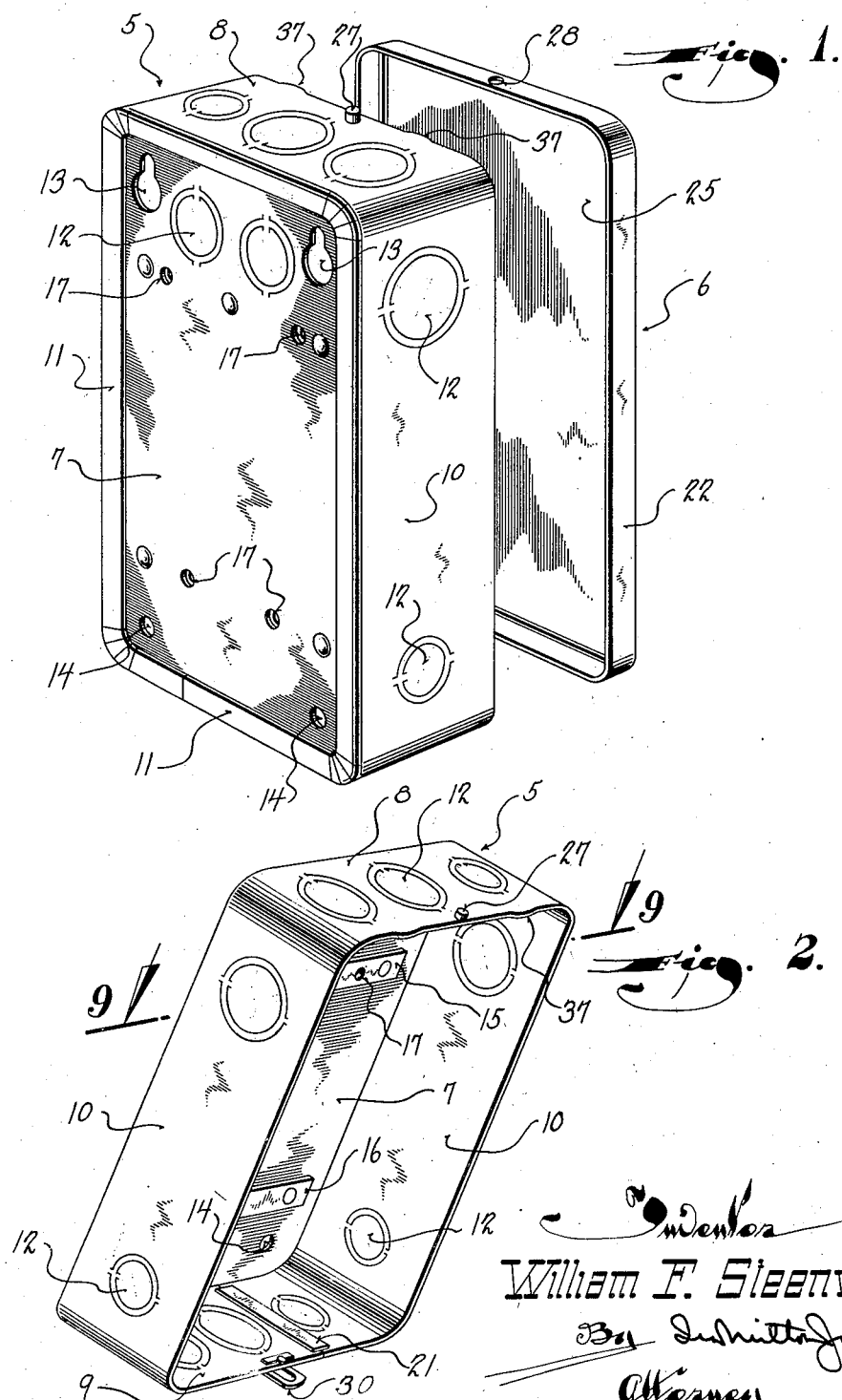

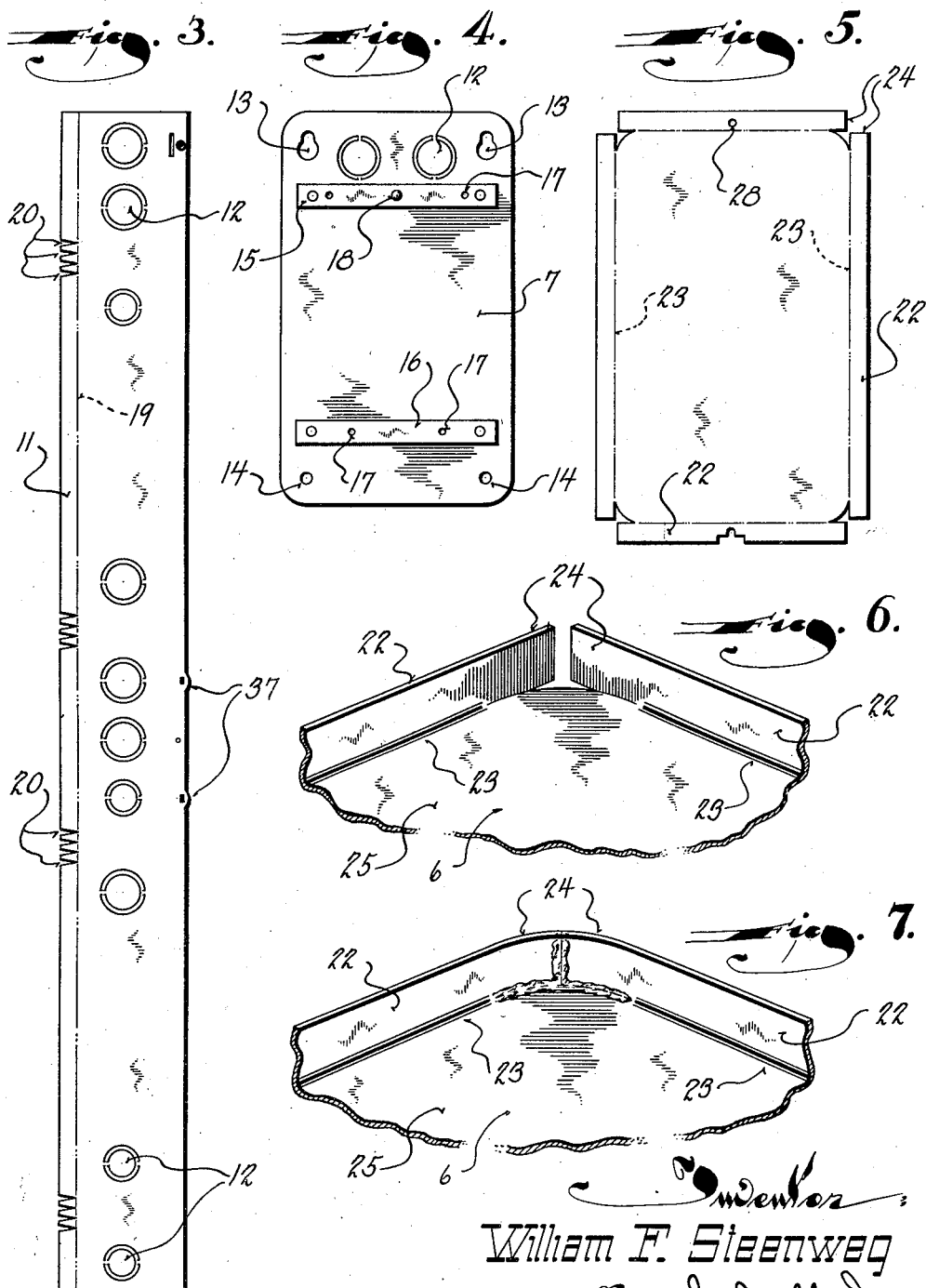

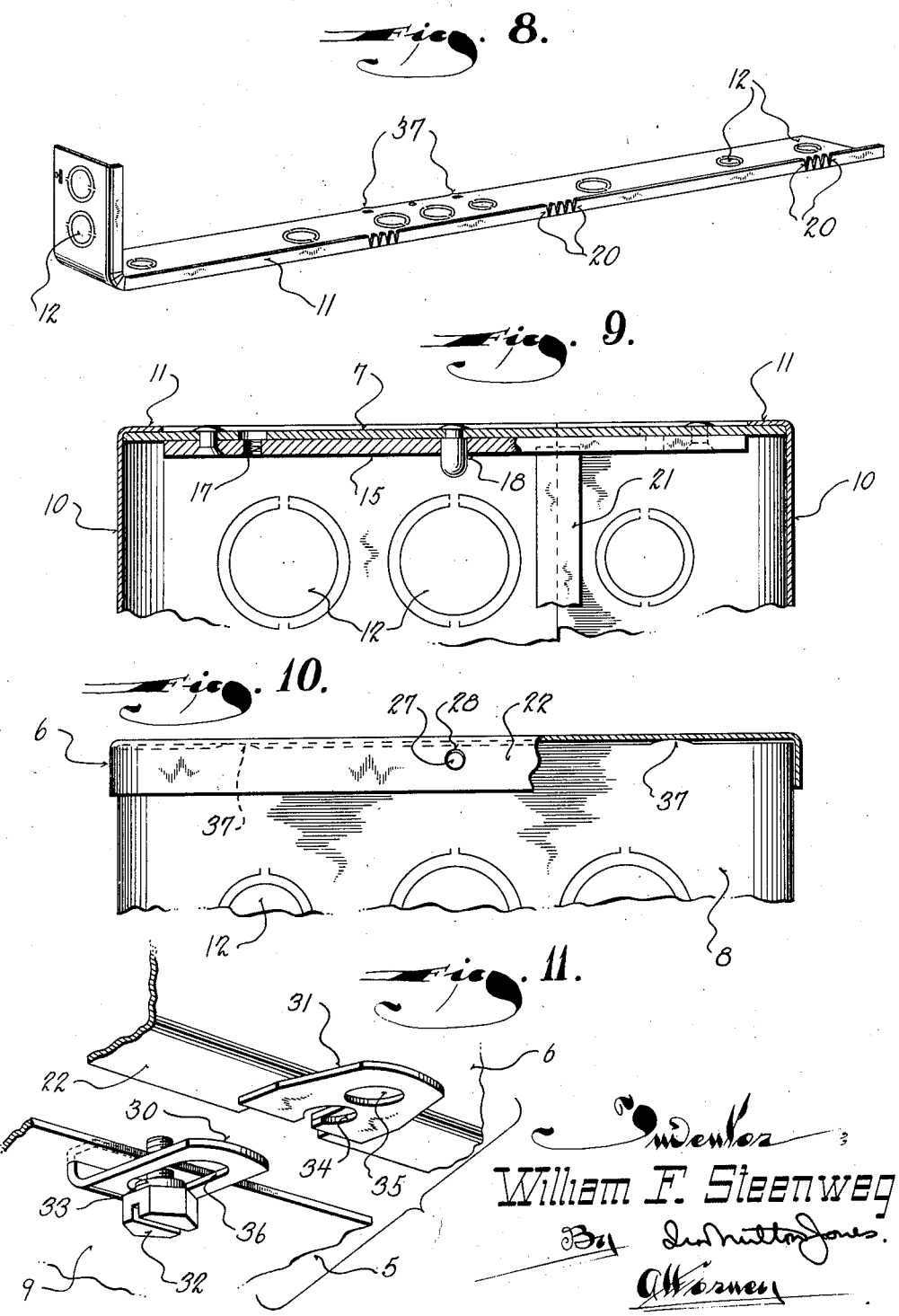

Patented Nov. 3, 1936

2,059,671

UNITED STATES PATENT OFFICE 2,059,671

CABINET FOR ELECTRICAL CONTROL DEVICES AND METHOD OF MAKING THE SAME

William F. Steenweg, Milwaukee, Wis., assignor to Allen-Bradley Company, Milwaukee, Wis., a corporation of Wisconsin Application April 15, 1935, Serial No. 16,387

5 Claims. (Cl. 113—116)

This invention relates to improvements in cabinets for electrical control instrumentalities and the like and has as an object to provide a cabinet of this character and a method of making the same by which good appearance and low cost of production are obtained.

Heretofore, cabinets for electrical control instrumentalities were either of the fabricated type or of the stamped and formed type.

The fabricated cabinets were made in accordance with conventional sheet metal working practice wherein the back wall of the box and the side and end walls thereof were formed from a single piece of sheet metal with the side and end walls bent up from the back wall and connected by lapped joints. All of the corners were square and sharp. The cover was formed in the same way. This, together with the lapped joints at the corners greatly detracted from the appearance of the cabinet.

Besides detracting from the appearance of the finished product, this past method of fabrication resulted in considerable variation in overall dimensions and in general precluded the degree of accuracy desired. The lapped corners also necessitated a loose fitting connection between the cover and box.

Stamping and forming both the box and cover from solid sheets of metal overcame some of the objections of the fabricated construction, but entailed a material increase in the cost of production. Forming the cabinets from one piece of metal greatly improved their appearance by substituting rounded corners and more graceful lines for the square sharp corners of the fabricated construction, but the formed box was even less accurate in view of the fact that the metal had to be drawn and stretched to a considerable extent with the resulting unequal distribution of stresses. As a consequence, "knock-out" holes and other openings in the walls of the cabinets could not be made until after the box was formed. The cost of this procedure obviously was high.

The present invention contemplates the elimination of the objectionable features of both past methods of construction and attains this object through a novel manner of fabricating the box and cover. With the present invention the unsightly sharp corners are eliminated and graceful rounded corners substituted therefor. Also, the objectionable lapped joints of the earlier fabricated constructions are entirely eliminated.

Another object of this invention is to provide an improved cabinet construction wherein a single set of dies may be used in the manufacture of cabinets of all sizes. This is a material advantage over the present method of stamping and forming the cabinets where each and every size of cabinet requires its own separate set of dies.

Another object of this invention is to provide a method of making cabinets of the character described wherein all mounting holes, "knockouts", mounting straps and other necessary dimensional locations are laid out on flat stock and all necessary punching is done on flat stock.

Another object of this invention is to provide a novel manner of forming the side and end walls of a box and of attaching the same to the bottom or back wall of the box.

A further object of this invention is to provide a novel manner of forming a corner on a flanged cover.

A still further object of this invention is to provide a cabinet construction which allows the back wall of the cabinet to which the instrumentalities are attached to be formed of heavier stock than the side walls and cover.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of a box and cover which together comprise a cabinet for electrical control instrumentalities, constructed in accordance with this invention;

Figure 2 is a perspective view showing particularly the inside of the box;

Figure 3 is a plan view or development of the blank from which the side and end walls of the box are formed;

Figure 4 is a plan view of the back wall of the box;

Figure 5 is a plan view or development of the cover blank;

Figures 6 and 7 are perspective views showing different steps in the formation of the corners on the cover;

Figure 8 is a perspective view of the blank or strip from which the side and end walls are formed showing the manner of bending the same to form the side and end walls;

Figure 9 is a detail section view through Figure 2 on the plane of the line 9—9;

Figure 10 is a top view of the assembled box and cover with part of the cover broken away and in section; and Figure 11 is a fragmentary perspective view to show the manner in which the cover is held closed.

Referring now more particularly to the accompanying drawings in which like numerals indicate like parts throughout the several views, the numeral 5 designates generally the box of the complete cabinet and the numeral 6 represents the cover therefor.

The box consists of a back wall 7, top and bottom or end walls 8 and 9, respectively, and side walls 10. The end and side walls have marginal flanges 11 which overlap the outside of the back wall 7 to be secured thereto, preferably by spot welding. The side and end walls as well as the back wall are provided with "knock-outs" 12 which may be of different sizes and located at points dependent upon the type of instrumentality to be housed within the cabinet.

Near its top, the back wall has keyhole shaped openings 13 for the reception of the heads of fastening screws (not shown) by which the box may be secured to a suitable support. To aid the supporting screws received in the openings 13, other fastening means (not shown) may be passed through holes 14 in the lower portion of the back wall.

It is to be observed that the flanges 11 by overlying the outside of the back wall serve to space the back wall from the surface of a support to which the box may be secured. The provision of this space insures a firm flush engagement between the box and its support. It also accommodates the heads of rivets or screws used to hold mounting straps or the like to the inner face of the back wall.

Two such mounting straps 15 and 16 are riveted or welded to the inside of the back wall. At spaced points, these straps as well as the back wall have openings 17 for the reception of fastening screws by which the instrumentality to be housed is secured to the back wall, and to facilitate proper location thereof, the upper strap 15 carries a dowel pin 18. The openings 17 may be threaded to permit the screws to be inserted from the front.

As noted hereinbefore, the space afforded by the thickness of the flanges accommodates the heads of rivets used in the securement of the straps 15 and 16 to the rear wall, and permits the box to be mounted flush against the surface of the supporting panel.

Attention is now particularly directed to the manner in which the box 5 is fabricated.

The rear wall 7 is a single solid sheet of metal blanked out as shown in Figure 4. The die used to form the rounded corners of the blank is the same regardless of the size of the cabinet, as the radius at the corners is identical in all instances.

Inasmuch as the rear wall 7 requires no bending and as it is entirely separate from the side and end walls of the box, it may be formed of heavier stock than that used for the side and end walls. This feature is particularly advantageous in larger cabinets as it affords added strength where it is needed, namely, that part of the cabinet which carries the weight of the instrumentalities housed therein.

The end and side walls 8, 9 and 10 are formed of one continuous piece of sheet metal which in its developed flat form is as shown in Figure 3. The length of this blank is equal to the perimeter of the box and its width is that of the width of the end or side walls plus the flange 11 which are bent up on the line indicated by the numeral 19.

At the portions of the strip or blank which are to form the rounded corners at the juncture of the end and side walls, the side edge of the strip which is to form the flange 11 has V-shaped notches 20 cut into it. These notches remove sufficient metal to permit the strip to be bent to form the rounded corners as best shown in Figure 8, and at the same time insure a continuous flange about the corners. Obviously, the number and spacing of the V-shaped notches is the same at each corner and as the corners all have the same radius regardless of the size of the cabinet, a single die serves for the formation of these notches in all instances.

The "knock-outs" 12 as well as any pierced holes or openings in the side and end walls are laid out and punched prior to any bending operations.

With the blank, from which the end and side walls are formed, properly bent to bring its ends into engagement, which as best seen in Figure 2 meet in the bottom wall of the box, the inside dimensions of the rectangular enclosure defined by the formed blank conform to the size and shape of the rear wall 7, and inasmuch as all punching is done on flat stock, accuracy in this respect is assured.

As noted hereinbefore, the rear wall 7 is preferably welded to the flanges 11 and to hold the ends of the blank from which the end and side walls are formed together, a strip of sheet metal 21 may be welded across the inner surface of its meeting ends, as shown in Figure 2.

On the outside of its top, bottom and side walls, the box has no projections whatever. The meeting edges at the bottom wall held together by the strip 21 abut directly so that the outside surface of the bottom wall is unbroken, and the corners are nicely rounded and no objectionable overlapping flanges are present. This assures neat appearance and also provides for a close fit between the box and the cover.

The cover 6 is formed from a single blank of sheet metal, but instead of having its marginal flange 22 which telescopes over the open front of the box formed by pressing the same up as in the prior methods by a forming die, it is bent along lines 23 (see Figure 5) in the same fashion as the flange 11 is bent up from the blank from which the end and side walls are formed.

The flange or inturned edge 22 of the cover extends continuously about the curved corners which fit snugly around the corners of the box. To form these corners on the cover in an inexpensive manner, the blank from which the cover is made has each corner punched or cut out as shown in Figure 5. The portion cut out from each corner of the blank has the shape of a square with a substantially triangular part attached to one corner thereof, or if the opening per se is considered, it has the shape of two opposed triangles arranged with their apexes abutting. The inner triangular portion of the cutout is an isosceles triangle with the base thereof curved to correspond to the curvature of the finished corner. The arc formed by the curved base is tangent to the bending lines 23 so that upon bending up the flanges or sides 22, the ends 24 thereof extend out straight past the point of tangency of said sides with the curved inner edge of the cutout, as shown in Figure 6.

After this operation the end portions of the flanges are formed to correspond to the curvature of the corner and to abut end to end, as shown in Figure 7, in which position they are welded together. The curved edges of the flat front face 25 of the cover is also welded to the adjacent edge of the curved wall about the corners. After the welding operation, the excess metal is filed off giving the formed corner an appearance comparable to that obtained by forming the entire cover from a single blank in one operation.

Inasmuch as the corners all have the same radius only a single die need be provided for cutting out the corners of the blank, and as the radius at the corners in all sizes of cabinets is the same, this one die is all that is necessary regardless of the size of the cabinet.

To secure the cover to the box, the top wall of the box has an upstanding pin 27 adapted to enter a hole 28 in the top flange of the cover. At the bottom of the box, a slotted finger or strip 30 projects forwardly therefrom at a distance beneath the plane of the bottom wall and the lower flange of the cover has a projection 31 fixed thereto to align with the strip 30 and overlie the same when the cover is in closed position.

A screw 32 threaded in the bottom wall of the box and having a shouldered portion 33 engageable in a keyhole 34 formed in the projection 31 serves to hold the cover and box together at the bottom. A hole 35 in the outer end of the projection 31 together with a slot 36 in the strip 30 provides means for the application of a padlock by which the cover may be locked closed.

Rattling between the box and cover is precluded by projections 37 on the front edge of the top wall which engage the inner surface of the cover to slightly stress the cover as it is moved to its closed position.

While it has been found desirable in practice to form the box of two pieces as described and to form the cover from a single blank, both the box and cover may be constructed from a single blank or both may be of the two part construction described without deviating from the spirit of the invention.

From the foregoing description taken in connection with the accompanying drawings, it will be readily apparent to those skilled in the art, that this invention provides a cabinet particularly well suited for housing electrical control instrumentalities which combines the good appearance of a stamped and formed cabinet with the low cost of a fabricated cabinet.

It is also apparent that the method of fabricating a cabinet provided by this invention permits the use of heavier stock for the back wall of the cabinet to which the instrumentalities are attached and the use of lighter stock for the side and end walls and cover which portions of the cabinet have bent portions. This is an advantage not only in that it affords added strength, but also in that it reduces the cost by permitting the use of lighter stock in those portions of the cabinet which carry no weight.

What I claim as my invention is:

1. The hereindescribed method of making a cabinet for electrical control instrumentalities having a bottom wall and side and end walls and having "knock-outs" in certain of said walls, which comprises cutting a blank of sheet metal to a width in excess of the height of said side and end walls and to a length equal to the perimeter of the cabinet, punching any "knock-outs" to be located in the side or end walls in the blank of sheet metal while the same is in its flat state, cutting four series of side by side V-shaped notches in one side edge of the blank, bending up said side edge portion of the blank to form a flange interrupted by said four series of V-shaped notches, bending said blank adjacent each series of notches so as to form a rectangle with a flange directed inwardly and with the ends of the blank meeting, securing said ends of the blank together, and securing a piece of flat sheet metal to form the bottom wall and shaped to conform to the size and shape of the rectangle defined by the side and end walls to said flange, the V-shaped notches in the flange allowing the blank which forms the side and end walls to be bent into a rounded corner with the flange continuing about the corner.

2. A sheet metal cabinet for electrical control instrumentalities and the like; comprising two initially separate parts, one of which consists of a flat bottom wall stamped from sheet metal sufficiently heavy to carry the weight of the instrumentalities to be housed and being adapted to have the instrumentalities mounted thereon, the other part consisting of side and end walls formed of one continuous piece of sheet metal of a length equal to the perimeter of the cabinet and having preformed "knock-outs" therein, said side and end walls being in the form of a frame the size of the bottom wall, flanges on one of said two parts overlapping the adjacent edges of the other part and secured thereto to permanently join said two parts, and means on the bottom wall for mounting the cabinet on a support so that all weight is borne by said bottom wall.

3. The hereindescribed method of making a cabinet for electrical control instrumentalities having a bottom wall and side and end walls and having "knock-outs" in certain of said walls which comprises blanking two parts from sheet metal, one of which is to form the bottom wall and the other the side and end walls, the blank forming the side and end walls having a length equal to the perimeter of the cabinet to be formed, punching all "knock-outs" into both blanks while the same are in their flat state so as to insure accuracy in the location of the "knock-outs", bending flanges on one of said parts to overlie the marginal edges of the other upon assembly, bending the blank forming the side and end walls so as to form a rectangle with a shape corresponding to the bottom wall, and securing together the flanges and the marginal edge portions which they overlap so as to permanently secure said two parts together.

4. A sheet metal cabinet for electrical control instrumentalities, comprising two initially separate parts, one of which consists of a flat bottom wall of sheet metal with straight marginal edges defining corners, the other part providing walls perpendicular to the bottom wall and consisting of one continuous elongated piece of sheet metal of a length equal to the perimeter of the cabinet as determined by the sum of the marginal edges of the bottom wall, which piece is bent at specified predetermined distances from the ends thereof to form corners corresponding to the corners of the bottom wall and having preformed "knock-outs" therein located at specified predetermined points with respect to the ends of the piece so as to be located at specified predetermined points in the walls formed by said piece, means permanently joining the ends of said piece so that it forms a frame the size and shape of the bottom wall, and flanges on one of said two parts overlapping the adjacent edges of the other part and secured thereto to permanently join the two parts into one rigid structure.

5. A sheet metal cabinet for electrical control instrumentalities and the like, comprising two separate parts, one of which consists of a flat bottom wall stamped from sheet metal for carrying the instrumentalities to be mounted thereon and housed within the cabinet, the part consisting of side and end walls formed of one continuous piece of sheet metal of a length equal to the perimeter of the cabinet, said side and end walls being in the form of a frame the size of the bottom wall, flanges on one of said two parts overlapping the adjacent edges of the other part and secured thereto to permanently join said two parts, and means on the bottom wall for mounting the cabinet on a support so that all weight is borne by said bottom wall.

WILLIAM F. STEENWEG.